May 23, 1939.   J. F. CLEMENS   2,159,205
CEMENT MIXER
Filed May 20, 1937   3 Sheets-Sheet 1

Inventor
J. F. CLEMENS.
Jesse R. Stone
Lester B. Clark
Attorneys.

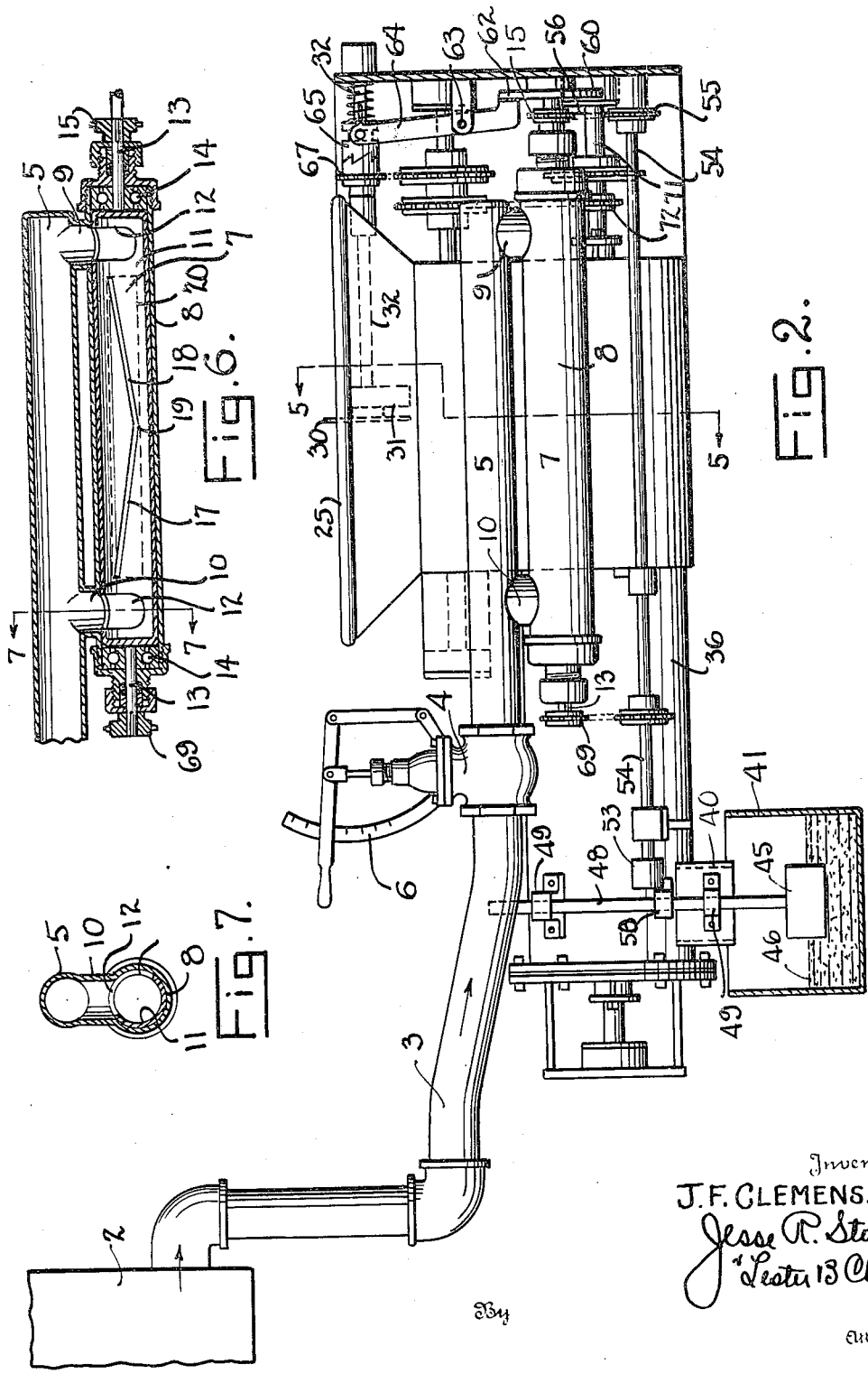

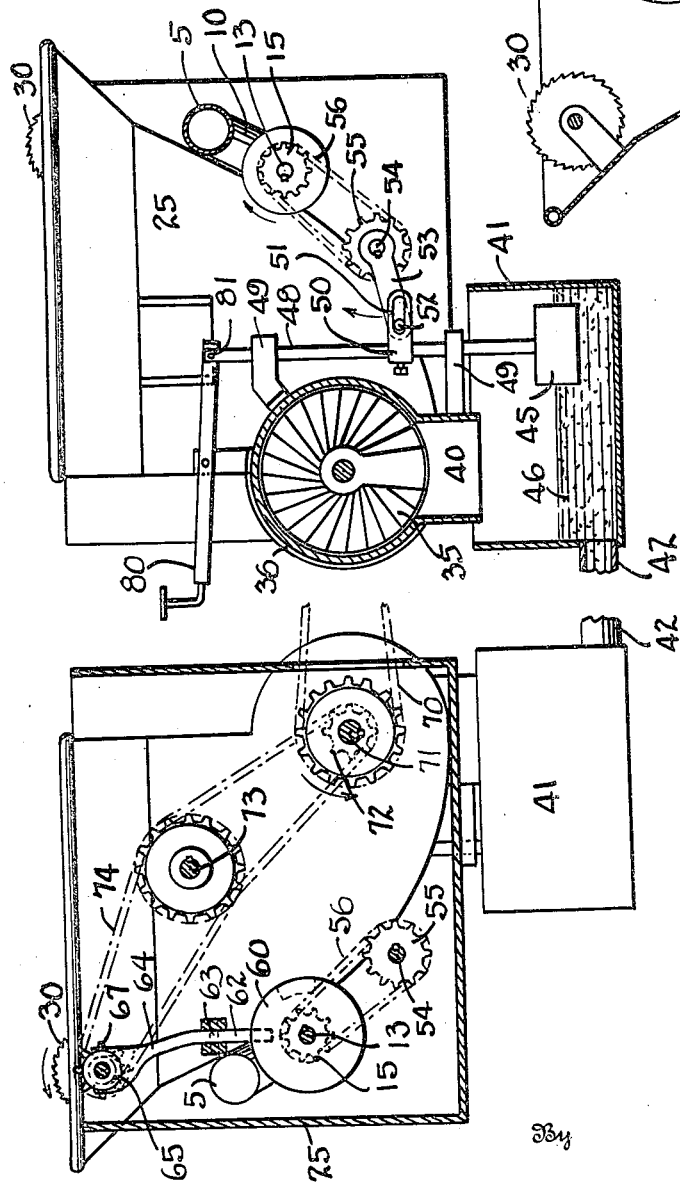

Patented May 23, 1939

2,159,205

UNITED STATES PATENT OFFICE 2,159,205

CEMENT MIXER

John F. Clemens, Refugio, Tex.

Application May 20, 1937, Serial No. 143,642

4 Claims. (Cl. 259—165)

The invention relates to a mixer for cement and similar materials and particularly of the type where the cement, after it is mixed, is discharged through a circulating pump. The invention has particular application to those cement mixers which are used for introducing a mixture of cement into a well bore where it is forced downwardly into a position around the outside of the well casing. In situations of this sort it is imperative that a uniform mix of a known composition be introduced into the well bore because it is subjected to varying pressures of temperature and diluting action of salt water and other liquids in the well.

It is one of the objects of the present invention to provide an apparatus by which a uniform mixture of cement and water will be produced.

Another object of the invention is to control the supply of water in accordance with the introduction of the cement to the mixer and the discharge of the cement into the pump.

Another object of the invention is to provide a rotary valve construction for admitting the water to the cement. Still another object of the invention is to control the cutter for opening the sacks of cement as well as the introduction of the supply of water by the discharge of the cement from the apparatus.

Still another object of the invention is to provide a float operated mechanism which will serve to operate the cement bag cutter and the water valve.

Other and further objects of the invention will be readily apparent when the following description is considered in connection with the accompanying drawings wherein Fig. 1 is a top plan view of the apparatus with certain parts broken away to illustrate the construction thereof.

Fig. 2 is a side elevation of the apparatus showing the clutching arrangement for controlling the bag cutter and the water supply.

Fig. 3 is an end view looking to the left at the end of Fig. 2.

Fig. 4 is a vertical section through the float control and showing the mixer in end elevation.

Fig. 5 is a section taken on the line 5—5 of Fig. 2, and looking in the direction of the arrows.

Fig. 6 is a horizontal section of the water valve.

Fig. 7 is a section taken on the line 7—7 of Fig. 6 and looking in the direction of the arrows.

Figure 1:
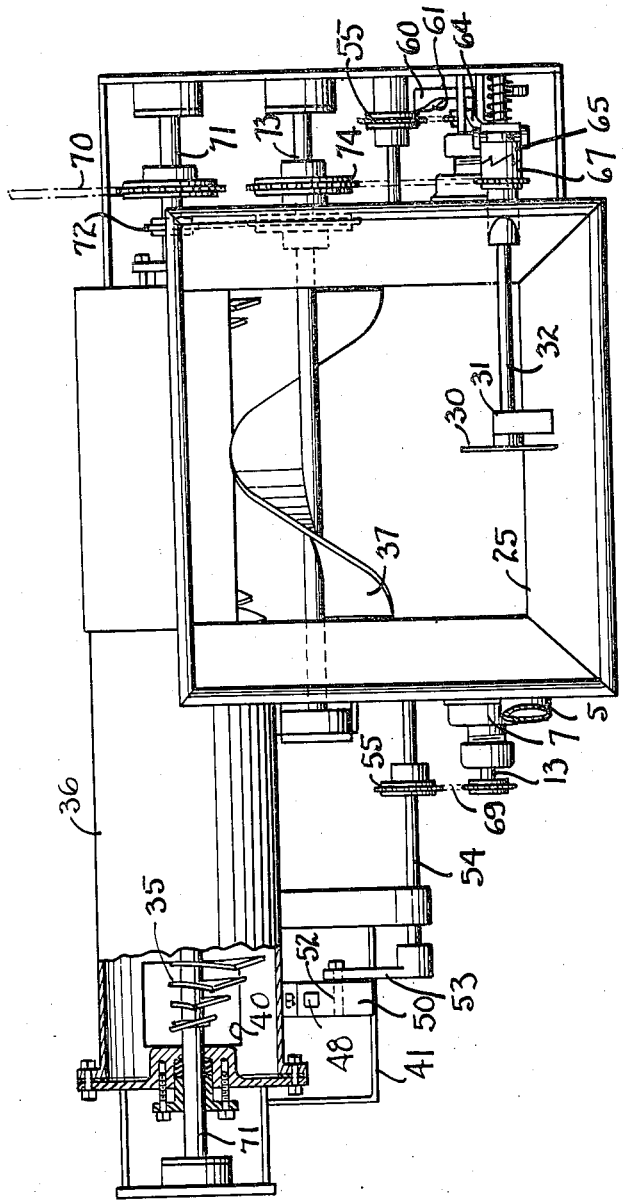

The general arrangement of the apparatus is best seen in Fig. 2, where a supply of water will be contained in the tank 2 and is discharged through the pipe 3 past the valve 4 and into the water manifold 5. The valve 4 may be of any desired type but is preferably of the quick acting type so that it may be quickly adjusted to turn on or cut off the water as desired. Such a valve is preferably adjustable so that it can be set for a predetermined flow, because the proportions of water and cement are very important in a mixer of this sort. An indicator 6 is positioned on the valve so that any desired setting may be made. The cement is usually introduced at a substantially uniform rate and if the water can be set to flow into the mixture at a uniform rate a resultant uniform mix of cement is obtained.

Fig. 6 shows the detailed construction of the valve by which the introduction of water is controlled. This valve is indicated generally at 7 and comprises a housing 8 which is of a cylindrical shape and which has the connections 9 and 10 leading into it from the manifold 5. It is through these connections that the water is introduced into the rotatable sleeve 11. This sleeve is provided with the elongated slots 12 so that water will flow into the sleeve during that period when the openings 9 and 10 are in alignment with the slots 12. Movement is imparted to the sleeve 11 by means of the shafts 13, one of which projects from each end of the sleeve. Anti-friction bearings 14 support these shafts in the housing 8, and if desired the drive or sprocket wheels 15 may be attached to the shafts 13.

In order that the water may discharge from the valve sleeve 11 it is provided with a longitudinal slot 17. This slot is arranged in two portions 18 which are inclined downwardly and toward each other as seen in Fig. 6, so that they meet at an apex 19. This slot is normally in such a circumferential position that it is in alignment with an opening 20 in the housing 8 so that it may discharge into the hopper 25, as best seen in Fig. 5. It seems obvious that by rotating or turning the valve sleeve 11 any desired portion of the slot opening 17 may be moved into alignment with the discharge port 20, so that the discharge of the water from the valve will be in this manner controlled.

The peculiar construction of this discharge slot 17 is of importance because it has been found in actual practice that the discharge of water can be more accurately controlled with a V-type slot of this configuration, because it gradually cuts off and turns on the flow of water in accordance with the rotation of the valve sleeve 11.

As shown in Fig. 5 the water discharging from the port 20 will strike the baffle 22 and be directed downwardly along the surface 23 on the inside of the hopper or mixing chamber 25.

The hopper 25 may be of any desired shape, size or configuration, but is here shown as rectangular and has positioned adjacent the center of its upper portion a saw or cutter 30 which is rotatably mounted in the bearings 31, and rotation is imparted to it by a shaft 32. This cutter may be of any form so that it is adapted to slit or cut the bags of cement as they are passed across it. In this manner the bag is cut and the cement will fall downwardly into the hopper, sliding downwardly over the baffle 22 and along the face 23 where it meets with the water from the valve 7. The paddle mixer 35 in the cylinder 36 tends to mix and convey the water and the cement. If desired an agitator blade 37 may be rotatably mounted in the middle of the hopper 25 so that there will be no lumps of cement passing into the hopper and so that the entire body of the material will be kept moving.

Fig. 1 shows the housing 36 as extended laterally beyond the hopper 25 and illustrates the discharge opening 40 therein through which the cement may pass downwardly into the container 41. This container is shown in Figs. 2, 3 and 4 and may be a box of any desired size which has an outlet 42 therethrough which is connected to a suitable pump by which the cement is forced downwardly into the well bore.

It seems obvious that the amount of cement to be mixed would, of course, be governed by the volume of cement being used or taken in by the suction pump and, therefore, the present mechanism has been devised with a float 45 which is arranged to ride in the body 46 of cement which is in the container 41. This float may be of any desired size or configuration so long as it will float upon the cement. A connecting rod 48 passes through the bearings 49 attached to the housing 36 and allows a free sliding vertical movement of the rod 48.

In operation this float is used to control both the water valve 8 and the sack cutter 30 because it is desirable to control the admission of the cement by the sack cutter and the admission of the water by the valve 7 in accordance with the volume of cement being used. To accomplish this a lever 50 is adjustably arranged upon the connecting rod 48 and is provided with a slot 51 which receives the pin 52 carried by the control arm 53. This arm is in turn keyed to a shaft 54 which carries a sprocket 55. A suitable chain or belt 56 passes about this sprocket and around a similar sprocket 15 on the end of the shaft 13, which carries the sleeve valve 11. Thus vertical movement of the float and its connecting rod will serve to oscillate or rotate the pinion 55, the pinion 15 and consequently the shaft 13 and the water valve 11. Thus if the pump draws the level of cement in the container down below a predetermined position, then the float will turn on the water valve and additional water will be admitted.

At the same time the water valve is operated by the movement of the rod 48 and rotation of the sprocket 15, an additional mechanism will be operated so as to apply power to the sack cutter 30. This mechanism is in the form of a cam plate 60 which is fixed on the shaft 13 beyond the sprocket 15, and has a lateral lug 61 thereon so that as the cam is partially rotated this lug will engage the lever 62 and cause it to move laterally. This lever is pivoted at 63 and has an oppositely extended arm portion 64 which will of course move in the opposite direction from the movement imparted to it at the other end by the cam lug 61. The end 64 has a clutch member 65 connected therewith which is splined on the shaft 32 and which is rotatable by a suitable yoke in the end of the arm 64. The lateral movement engages and disengages the clutch 65 so that the pinion 67 will be connected to or disconnected from the shaft 32.

By this operation the sack cutter 30 will be connected to the power source and disconnected therefrom whenever the valve 11 moves to admit or cut off the flow of water.

A duplicate connection between the shaft 54 and the shaft 13 of the water valve is shown at 69 in Fig. 2. In this manner power is applied at both ends of the valve member to control its movement.

In Fig. 1 a chain 70 is shown as leading to a source of power not illustrated and passes over the main shaft 71 which drives the agitator blades 35. Another set of sprockets 72 are also connected to the shaft 73 to transmit power to the blades 37, while a third set of sprockets 74 transmits the power to the drive member 67 on the sack cutter shaft 32.

It is believed that the operation of the device will be readily understood, but the essential feature thereof is to control the admission of cement to the mixer by turning on and cutting off the operation of the sack cutter 30, and simultaneously therewith operating the valve member 11 to turn on or cut off the supply of water. By adjustment of the valve 4 the flow of water to the valve 11 may be so regulated that when the valve is turned on and sacks of cement continuously applied to the sack cutter 30, then the desired mix of cement will be obtained. In some instances a heavier or thicker mix of cement is required than in other instances and it is intended that the simultaneous admittance of the cement and water will obtain the desired mix, depending upon the regulation of valve 4. If desired a lever 80 may be connected at 81 to the vertical connection 48 so that both the water and the cement mechanisms may be operated independently of the float 45.

What is claimed is:

1. A cement mixer comprising a hopper, a mixing apparatus therein, means for driving said mixing apparatus, a water inlet, a rotatable valve operable to control the volume of water, a cutter device movable to slit the cement sacks, and means operable independently of said mixing apparatus to close said valve and stop movement of said cutter whereby said first means continues to drive said mixing apparatus.

2. A cement mixer comprising a hopper, a mixing apparatus therein, a water inlet, a rotatable valve operable to control the volume of water, a cutter device movable to slit the cement sacks, and means operable to close said valve and stop movement of said cutter, said means comprising a container for the mixed cement discharging from said mixer and a float movable by the variation in the level of the mixed cement in said container.

3. The combination of a cement mixer including a hopper, an agitator therein, a control valve to admit water, a sack cutter, a discharge from said mixer, a container to receive the mixed cement, a float in said container, and a mechanism operable by said float to control said valve and said sack cutter.

4. The combination of a cement mixer including a hopper, an agitator therein, a control valve to admit water, a sack cutter, a discharge from said mixer, a container to receive the mixed cement, a float in said container, a mechanism operable by said float to control said valve and said sack cutter, and a regulator valve adjustable to admit a predetermined volume of water to said control valve.

JOHN F. CLEMENS.